US012000304B2

(12) United States Patent
Izumi et al.

(10) Patent No.: US 12,000,304 B2
(45) Date of Patent: Jun. 4, 2024

(54) TURBINE BLADE AND GAS TURBINE

(71) Applicant: MITSUBISHI HEAVY INDUSTRIES, LTD., Tokyo (JP)

(72) Inventors: Yusuke Izumi, Tokyo (JP); Yasuo Miyahisa, Tokyo (JP); Shunsuke Torii, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/137,763

(22) Filed: Apr. 21, 2023

(65) Prior Publication Data

US 2023/0358141 A1 Nov. 9, 2023

(30) Foreign Application Priority Data

May 6, 2022 (JP) ................................. 2022-076530

(51) Int. Cl.
*F01D 5/18* (2006.01)

(52) U.S. Cl.
CPC ........ *F01D 5/187* (2013.01); *F05D 2240/127* (2013.01); *F05D 2250/185* (2013.01); *F05D 2260/2212* (2013.01); *F05D 2260/22141* (2013.01)

(58) Field of Classification Search
CPC ............... F01D 5/187; F05D 2240/127; F05D 2250/185; F05D 2260/22141; F05D 2260/2212
See application file for complete search history.

(56) References Cited

U.S. PATENT DOCUMENTS 3,628,885 A * 12/1971 Sidenstick ................ F01D 5/20 416/193 A
4,180,373 A * 12/1979 Moore .................... F01D 5/187 415/115
4,514,144 A * 4/1985 Lee ......................... F01D 5/187 416/97 R (Continued)

FOREIGN PATENT DOCUMENTS

JP 11-229806 8/1999
JP 2004-137958 5/2004

(Continued)

*Primary Examiner* — John M Zaleskas
(74) *Attorney, Agent, or Firm* — Wenderoth, Lind & Ponack, L.L.P.

(57) ABSTRACT

A turbine blade includes: a blade body; and a plurality of cooling passages each extending inside the blade body along a blade height direction and are connected to each other via return portions disposed at an end portion in the blade height direction to form a serpentine passage. The cooling passages include: an upstream passage disposed on an upstream side in a flow of a cooling fluid among the plurality of cooling passages; a downstream passage disposed on a downstream side in the flow of the cooling fluid among the plurality of cooling passages; and at least one intermediate passage disposed between the upstream passage and the downstream passage among the plurality of cooling passages. The upstream passage is disposed closest to a leading edge in a chord direction of the blade body among the plurality of cooling passages formed inside the blade body and extending along the height direction.

9 Claims, 11 Drawing Sheets

(56) References Cited

U.S. PATENT DOCUMENTS

| | | | | | |
|---|---|---|---|---|---|
| 4,515,526 | A * | 5/1985 | Levengood | F01D 5/187 | 415/115 |
| 4,627,480 | A * | 12/1986 | Lee | F01D 5/187 | 164/369 |
| 4,775,296 | A * | 10/1988 | Schwarzmann | F01D 5/187 | 415/115 |
| 5,395,212 | A * | 3/1995 | Anzai | F01D 5/187 | 415/115 |
| 5,472,316 | A * | 12/1995 | Taslim | F01D 5/187 | 416/97 R |
| 5,488,825 | A * | 2/1996 | Davis | F01D 5/187 | 415/115 |
| 5,681,144 | A * | 10/1997 | Spring | F01D 5/187 | 415/115 |
| 5,695,320 | A * | 12/1997 | Kercher | F28F 13/12 | 415/115 |
| 5,695,321 | A * | 12/1997 | Kercher | F01D 5/187 | 415/115 |
| 5,695,322 | A * | 12/1997 | Jacobson | F01D 5/187 | 415/115 |
| 5,700,132 | A * | 12/1997 | Lampes | F01D 5/187 | 415/115 |
| 5,797,726 | A * | 8/1998 | Lee | F28F 13/12 | 416/97 R |
| 5,997,245 | A * | 12/1999 | Tomita | F01D 9/041 | 415/115 |
| 6,036,440 | A * | 3/2000 | Tomita | B22C 21/14 | 415/114 |
| 6,089,826 | A * | 7/2000 | Tomita | F01D 5/187 | 415/115 |
| 6,227,804 | B1 * | 5/2001 | Koga | F01D 5/187 | 415/115 |
| 6,257,830 | B1 * | 7/2001 | Matsuura | F01D 5/147 | 415/115 |
| 6,290,462 | B1 * | 9/2001 | Ishiguro | F01D 5/187 | 416/97 R |
| 6,331,098 | B1 * | 12/2001 | Lee | F01D 5/187 | 416/97 R |
| 6,641,362 | B1 * | 11/2003 | Anding | F01D 5/187 | 415/115 |
| 7,572,102 | B1 * | 8/2009 | Liang | B22C 9/103 | 415/115 |
| 7,645,122 | B1 * | 1/2010 | Liang | F01D 5/187 | 416/97 R |
| 7,988,417 | B1 * | 8/2011 | Liang | F01D 5/187 | 415/115 |
| 8,231,350 | B1 * | 7/2012 | Liang | F01D 5/087 | 416/97 R |
| 8,628,298 | B1 * | 1/2014 | Liang | F01D 5/187 | 416/97 R |
| 2003/0108422 | A1 * | 6/2003 | Merry | F01D 5/187 | 416/97 R |
| 2004/0146402 | A1 * | 7/2004 | Soechting | F01D 5/186 | 416/97 R |
| 2005/0175454 | A1 * | 8/2005 | Dube | F01D 5/187 | 416/97 R |
| 2006/0171808 | A1 * | 8/2006 | Liang | F01D 5/18 | 416/97 R |
| 2008/0152475 | A1 * | 6/2008 | Zausner | F01D 5/187 | 415/1 |
| 2008/0159874 | A1 * | 7/2008 | Pietraszkiewicz | F01D 5/186 | 415/115 |
| 2008/0279695 | A1 * | 11/2008 | Abdel-Messeh | F01D 5/225 | 415/173.1 |
| 2009/0003987 | A1 * | 1/2009 | Zausner | F01D 5/187 | 415/115 |
| 2009/0035128 | A1 * | 2/2009 | Ahmad | F01D 5/187 | 415/177 |
| 2009/0041587 | A1 * | 2/2009 | Konter | F01D 5/187 | 415/115 |
| 2009/0087312 | A1 * | 4/2009 | Bunker | F01D 5/187 | 416/223 R |
| 2012/0269615 | A1 * | 10/2012 | Kuwabara | F01D 5/186 | 415/116 |
| 2013/0045111 | A1 * | 2/2013 | Lee | F01D 5/187 | 416/97 R |
| 2014/0086756 | A1 * | 3/2014 | Papple | F01D 5/081 | 416/95 |
| 2014/0112799 | A1 * | 4/2014 | Lee | F01D 5/187 | 416/97 R |
| 2015/0003975 | A1 * | 1/2015 | Shchukin | F01D 5/187 | 415/178 |
| 2015/0159489 | A1 * | 6/2015 | Lee | F01D 5/189 | 416/97 R |
| 2015/0322798 | A1 * | 11/2015 | Bauer | F01D 5/186 | 416/95 |
| 2016/0273366 | A1 * | 9/2016 | Papple | F01D 5/187 | |
| 2016/0319671 | A1 * | 11/2016 | Benson | F01D 5/187 | |
| 2017/0275998 | A1 * | 9/2017 | Lee | F01D 25/12 | |
| 2017/0292386 | A1 * | 10/2017 | Zhang | F01D 5/187 | |
| 2019/0003319 | A1 * | 1/2019 | Lee | F01D 5/187 | |
| 2019/0376393 | A1 * | 12/2019 | Styborski | F01D 5/187 | |
| 2020/0263554 | A1 * | 8/2020 | Miyahisa | F01D 5/187 | |
| 2021/0025279 | A1 * | 1/2021 | Wakazono | F01D 5/187 | |
| 2021/0123349 | A1 * | 4/2021 | Tsuji | F01D 9/065 | |

FOREIGN PATENT DOCUMENTS

| | | | | |
|---|---|---|---|---|
| JP | 2015-214979 | | 12/2015 | |
| JP | 2019-85973 | | 6/2019 | |
| KR | 20020069462 | A * | 9/2002 | |
| WO | WO-2015156816 | A1 * | 10/2015 | F01D 5/187 |

* cited by examiner

TURBINE BLADE AND GAS TURBINE

TECHNICAL FIELD

The present disclosure relates to a turbine blade and a gas turbine.

BACKGROUND ART

In a turbine blade of a gas turbine or the like, it is known that the turbine blade exposed to hot gas flow is cooled by flowing a cooling fluid through a cooling passage formed inside the turbine blade.

For example, Patent Documents 1 to 4 each disclose a turbine blade having an airfoil portion inside of which a meandering passage (serpentine passage) is formed by a plurality of cooling passages extending along the blade height direction. On inner wall surfaces of the cooling passages of the turbine blade, rib-shaped turbulators are provided. The turbulators are provided in order to improve a heat transfer coefficient between the cooling fluid and the turbine blade by promoting turbulence of the flow of the cooling fluid in the cooling passages.

Further, Patent Document 4 describes that the inclination angle of the turbulators with respect to the flow direction of the cooling fluid in the cooling passages constituting the serpentine passage is made smaller in a downstream passage than in an upstream passage to suppress cooling of the turbine blade in the upstream passage while enhancing cooling of the turbine blade in the downstream passage.

CITATION LIST

Patent Literature

Patent Document 1: JPH11-229806A
Patent Document 2: JP2004-137958A
Patent Document 3: JP2015-214979A
Patent Document 4: JP2019-085973A

SUMMARY

A turbine blade with turbulators in the serpentine passage max be locally overcooled depending on the position of the turbine blade in the turbine. If excessive cooling occurs in the turbine blade, the efficiency of cooling air utilization may decrease, and the efficiency of the turbine as a whole max decrease.

In view of the above, an object of at least one embodiment of the present invention is to provide a turbine blade and a gas turbine whereby it is possible to effectively cool the turbine blade while suppressing excessive cooling of the turbine blade.

A turbine blade according to at least one embodiment of the present invention is provided with: a blade body; and a plurality of cooling passages each of which extends inside the blade body along the blade height direction and which are connected to each other via return portions disposed at an end portion in the blade height direction to form a serpentine passage. The plurality of cooling passages includes: a most upstream passage disposed on the most upstream side in a flow of a cooling fluid among the plurality of cooling passages; a most downstream passage disposed on the most downstream side in the flow of the cooling fluid among the plurality of cooling passages; and at least one intermediate passage disposed between the most upstream passage and the most downstream passage among the plurality of cooling passages. The most upstream passage is disposed at a position closest to a leading edge in the chord direction of the blade body among the plurality of cooling passages formed inside the blade body and extending along the height direction. The turbine blade is provided with: a plurality of first turbulators disposed on an inner wall surface of the most upstream passage and arranged along the blade height direction; a plurality of second turbulators disposed on an inner wall surface of the at least one intermediate passage and arranged along the blade height direction; and a plurality of third turbulators disposed on an inner wall surface of the most downstream passage and arranged along the blade height direction. An average value of first angles of the plurality of first turbulators with respect to a flow direction of the cooling fluid in the most upstream passage is smaller than an average value of second angles of the plurality of second turbulators with respect to a flow direction of the cooling fluid in the at least one intermediate passage.

A gas turbine according to at least one embodiment of the present invention is provided with: a turbine including the above-described turbine blade; and a combustor for producing a combustion gas flowing through a combustion gas passage in which the turbine blade is disposed.

At least one embodiment of the present invention provides a turbine blade and a gas turbine whereby it is possible to effectively cool the turbine blade while suppressing excessive cooling of the turbine blade.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

(Configuration of Gas Turbine)

Figure 1:
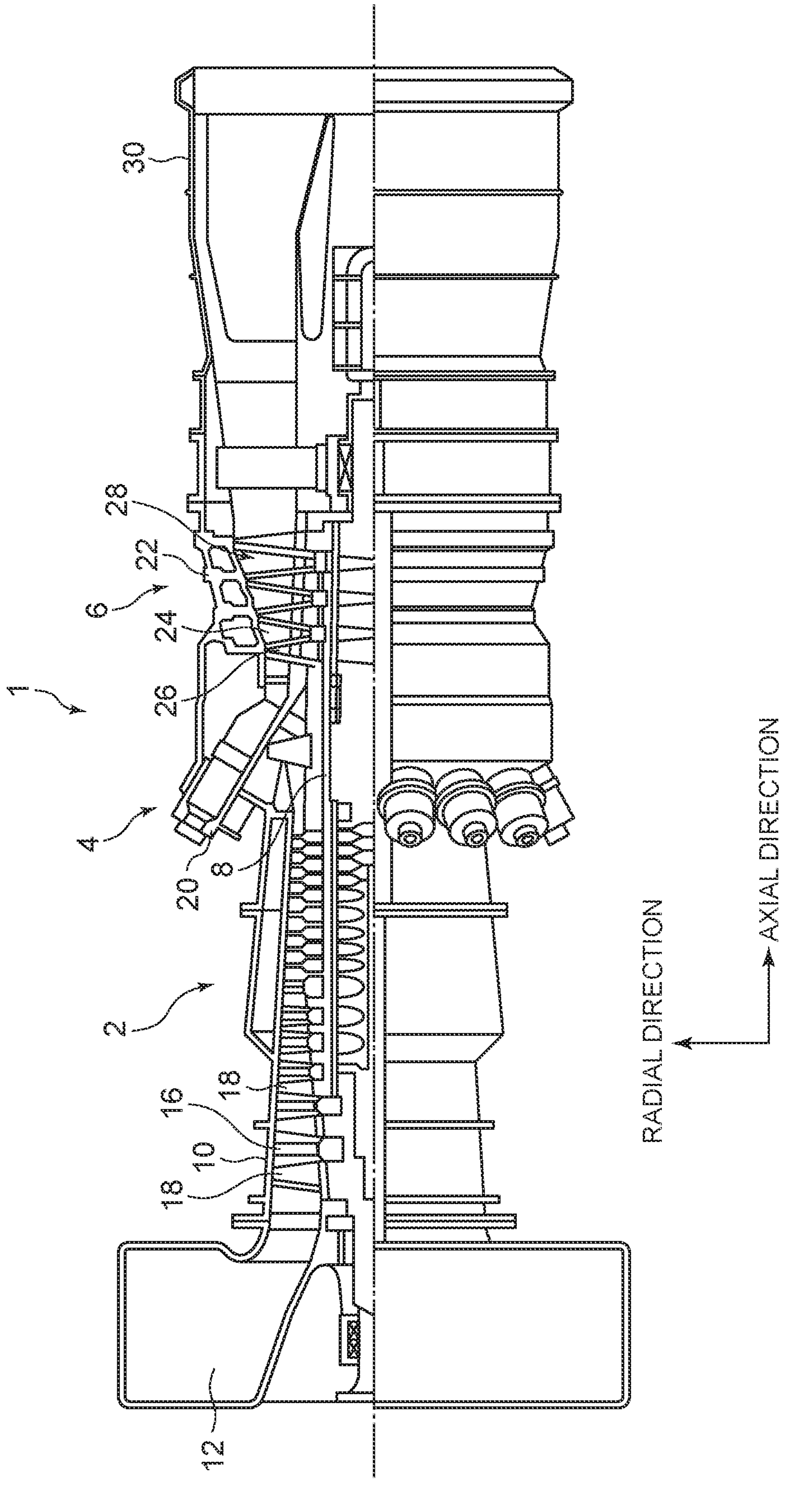
FIG. 1 is a schematic configuration diagram of a gas turbine according to an embodiment.

First, a gas turbine to which a turbine blade according to some embodiments is applied will be described. FIG. 1 is a schematic configuration diagram of a gas turbine to which a turbine blade according to an embodiment is applied. As shown in FIG. 1, the gas turbine 1 includes a compressor 2 for producing compressed air, a combustor 4 for producing combustion gas from the compressed air and fuel, and a turbine 6 configured to be rotationally driven by the combustion gas. In the case of the gas turbine 1 for power generation, a generator (not shown) is connected to the turbine 6.

The compressor 2 includes a plurality of stator vanes 16 fixed to a compressor casing 10 and a plurality of rotor blades 18 implanted on a rotor 8 alternately with the stator vanes 16. Intake air from an air inlet 12 is sent to the compressor 2. The air passes through the plurality of stator vanes 16 and the plurality of rotor blades 18 and is compressed into compressed air having high temperature and high pressure.

The combustor 4 is supplied with fuel and the compressed air generated by the compressor 2. In the combustor 4, the fuel and the compressed air are mixed and combusted to generate the combustion gas which serves as a working fluid of the turbine 6. As shown in FIG. 1, a plurality of combustors 4 may be arranged along the circumferential direction around the rotor in the casing 20.

The turbine 6 has a combustion gas passage 28 formed in a turbine casing 22 and includes a plurality of stator vanes 24 and a plurality of rotor blades 26 disposed in the combustion gas passage 28. The stator vanes 24 are fixed to the turbine casing 22, and a set of the stator vanes 24 arranged along the circumferential direction of the rotor 8 forms a stator vane row. Further, the rotor blades 26 are mounted on the rotor 8, and a set of the rotor blades 26 arranged along the circumferential direction of the rotor 8 forms a rotor blade row. The stator vane rows and the rotor blade rows are alternately arranged in the axial direction of the rotor 8.

In the turbine 6, as the combustion gas introduced from the combustor 4 into the combustion gas passage 28 passes through the plurality of stator vanes 24 and the plurality of rotor blades 26, the rotor 8 is rotationally driven. Thereby, the generator connected to the rotor 8 is driven to generate power. The combustion gas having driven the turbine 6 is discharged outside via an exhaust chamber 30.

In some embodiments, at least one of the rotor blade 26 or the stator vane 24 of the turbine 6 is a turbine blade 40 described below. In the following, the stator vane 24 will be described mainly as the turbine blade 40 with reference to drawings, but basically the same description can be applied to the rotor blade 26 as the turbine blade 40.

(Configuration of Turbine Blade)

Figure 2:
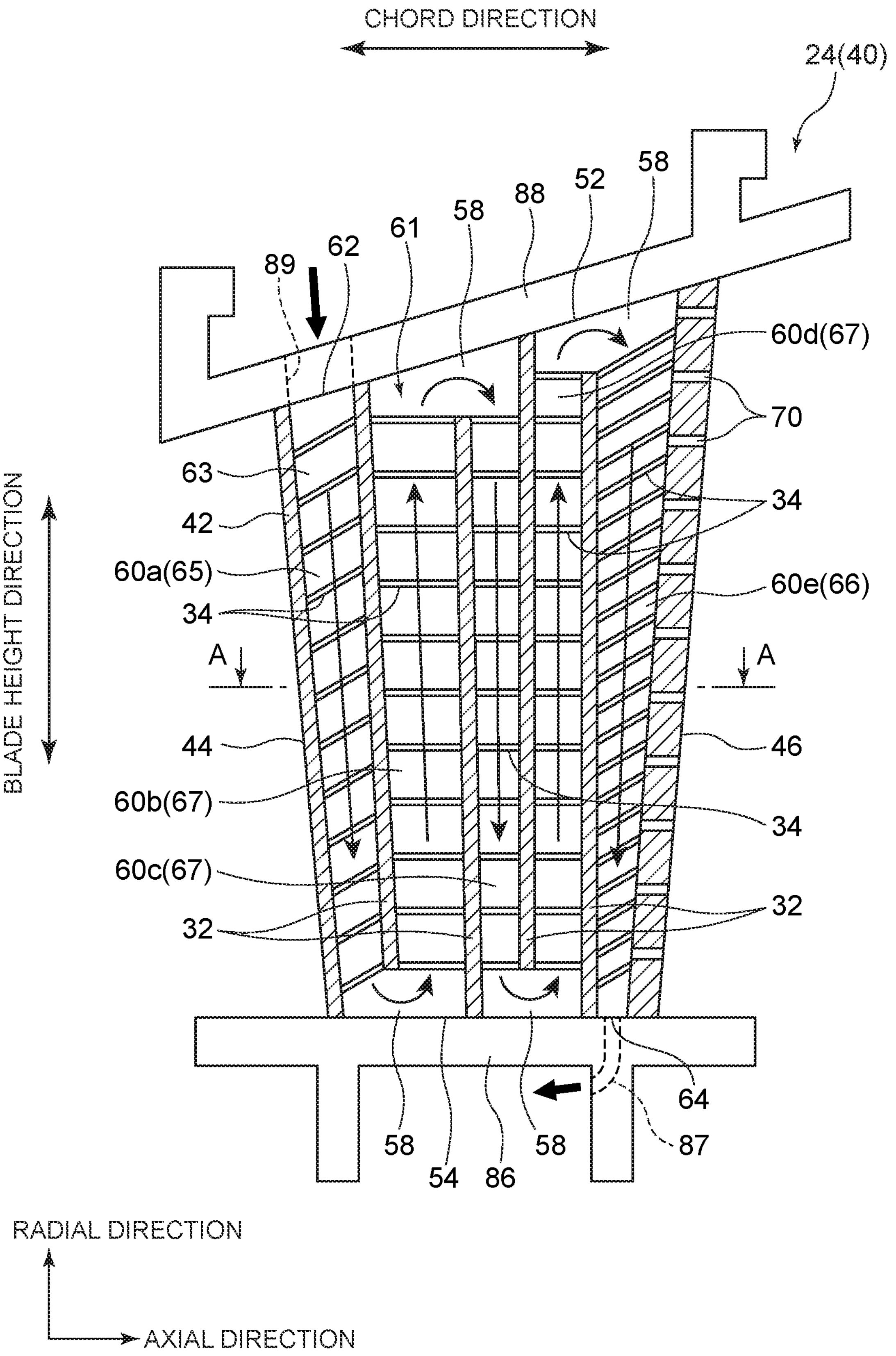
FIG. 2 is a schematic partial cross-sectional view of a stator vane (turbine blade) according to an embodiment taken along the blade height direction.
Figure 3:
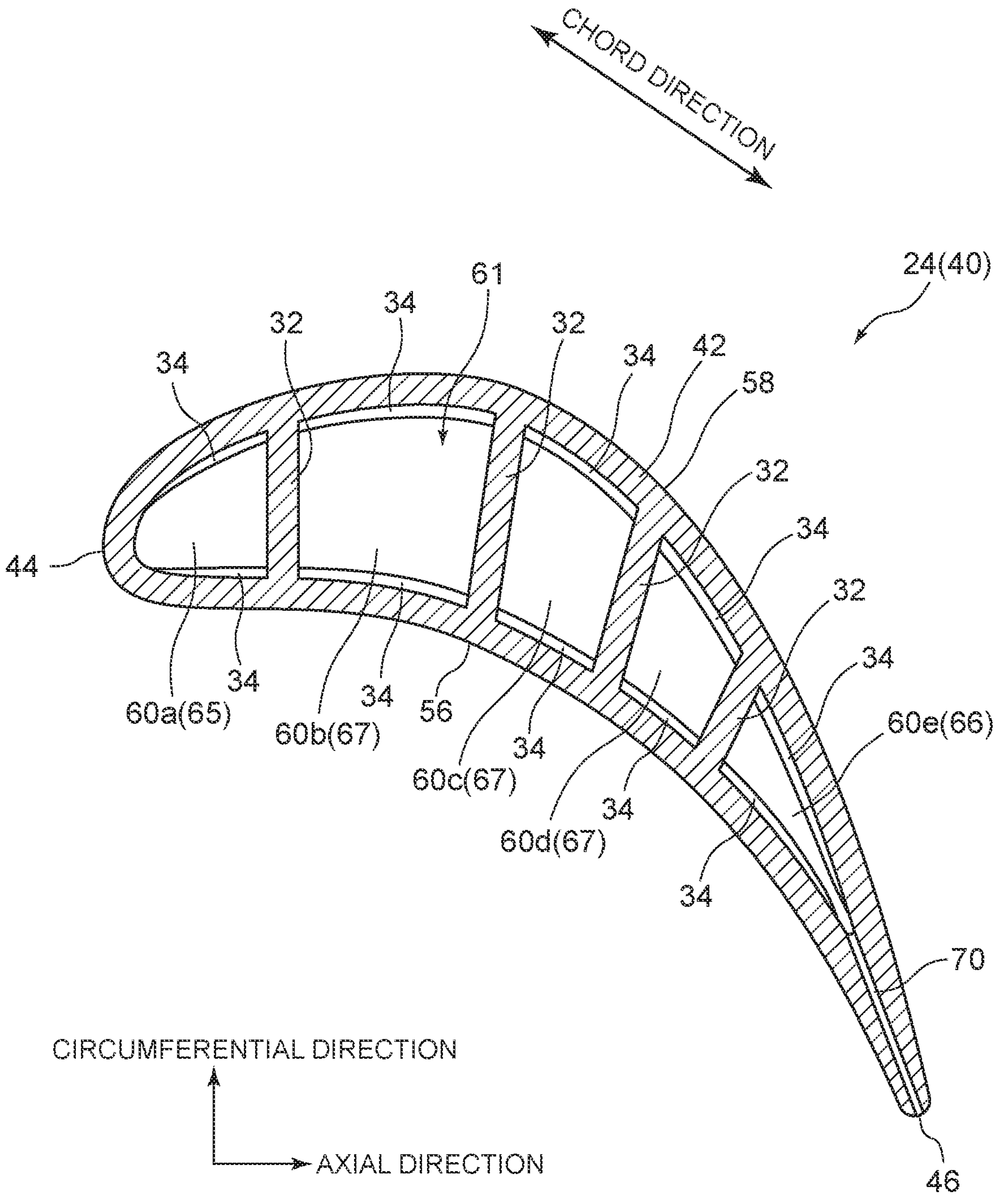
FIG. 3 is a schematic cross-sectional view taken along line A-A in FIG. 2.

FIG. 2 is a schematic partial cross-sectional view of the stator vane 24 (turbine blade 40) according to an embodiment taken along the blade height direction. FIG. 3 is a schematic cross-sectional view taken along line A-A in FIG. 2. The arrows in the figure indicate the direction of flow of the cooling fluid. The "radial direction", "axial direction", and "circumferential direction" in the figures respectively refer to the radial direction, axial direction, and circumferential direction of the turbine rotor When the turbine blade 40 is installed in the turbine 6.

As shown in FIGS. 2 and 3, the stator vane 24 (turbine blade 40) according to an embodiment includes a blade body 42, an inner shroud 86 and an outer shroud 88 connected to both end portions of the blade body 42 in the blade height direction. Here, the blade height direction of the turbine blade 40 (i.e., the blade height direction of the blade body 42) corresponds to the radial direction of the turbine rotor on which the turbine blade 40 is installed. When the stator vane 24 is installed in the turbine 6, the inner shroud 86 is disposed radially inward of the blade body 42, and the outer shroud 88 is disposed radially outward of the blade body 42.

The outer shroud 88 is supported by the turbine casing 22 (see FIG. 1), and the stator vane 24 is supported by the turbine casing 22 via the outer shroud 88. The blade body 42 has a radially outer end 52 on the outer shroud 88 side (i.e., on the radially outer side), and a radially inner end 54 on the inner shroud 86 side (i.e., on the radially inner side).

The blade body 42 of the stator vane 24 has a leading edge 44 and a trailing edge 46 from the radially outer end 52 to the radially inner end 54. The blade surface of the blade body 42 includes a positive-pressure surface (pressure surface) 56 and a negative-pressure surface (suction surface) 58 extending along the blade height direction between the radially outer end 52 and the radially inner end 54.

The blade body 42 has a cooling flow path through which a cooling fluid (e.g., air) flows to cool the turbine blade 40. In the exemplary embodiment shown in FIGS. 2 and 3, the blade body 42 has a serpentine passage 61 including a plurality of cooling passages 60 as the cooling flow path.

In the turbine blade 40, the serpentine passage 61 includes a plurality of cooling passages 60*a*, 60*b*, 60*c*, . . . (hereinafter, also referred to as "cooling passage 60" collectively) each extending along the blade height direction. Inside the blade body 42 of the turbine blade 40, a plurality of ribs 32 are disposed along the blade height direction. Each adjacent cooling passages 60 are divided by one of the ribs 32.

In the exemplary embodiment shown in FIGS. 2 and 3, the serpentine passage 61 includes five cooling passages 60*a* to 60*e*. The cooling passages 60*a* to 60*e* are arranged in this order from the leading edge 44 to the trailing edge 46.

Two adjacent cooling passages (e.g., cooling passage 60*a* and cooling passage 60*b*) of the plurality of cooling passages 60 forming the serpentine passage 61 are connected via a return portion 58 disposed at an end portion (an end portion on the radially outer end 52 side or an end portion on the radially inner end 54 side) in the blade height direction. At this return portion 58, a return passage is formed where the direction of flow of the cooling fluid turns back in the blade height direction. Thus, the serpentine passage 61 has a serpentine shape in the radial direction as a whole. That is, the plurality of coolie g passages 60 communicate with each other to form the serpentine passage 61.

The plurality of cooling passages 60 forming the serpentine passage 61 includes a most upstream passage 65 disposed on the most upstream side in the flow of the cooling fluid, a most downstream passage 66 disposed on the most downstream side in the flow of the cooling fluid, and an intermediate passage 67 disposed between the most upstream passage 65 and the most downstream passage 66 among the plurality of cooling passages 60. In the exemplary embodiments shown in FIGS. 2 and 3, among the plurality of cooling passages 60, the cooling passage 60*a* closest to the leading edge 44 is the most upstream passage 65, the cooling passage 60*e* closest to the trailing edge 46 is the most downstream passage 66, and the cooling passages 60*b*, 60*c*, and 60*d* between the cooling passage 60*a* and the cooling passage 60*e* are the intermediate passages 67.

In the exemplary embodiments shown in FIGS. 2 and 3, the most upstream passage 65 (i.e., cooling passage 60*a*) constituting the serpentine passage 61 is the passage closest to the leading edge 44 in the chord direction of the blade body 42 among the plurality of cooling passages formed inside the blade body 42 and extending along the height direction. In other words, there are no other cooling passages extending along the blade height direction in a position between the leading edge 44 and the serpentine passage 61 in the chord direction.

In the turbine blade 40 having the above-described serpentine passage 61, the cooling fluid is introduced into the serpentine passage 61 via an internal passage 89 formed inside the outer shroud 88 and an inlet opening 62 formed at the radially outer end 52 of the blade body 42, and the cooling fluid flows downward through the plurality of cooling passages 60 sequentially. Then, the cooling fluid flowing, through the most downstream passage 66 most downstream in the flow direction of the cooling fluid among the plurality of cooling passages 60 flows out to the combustion gas passage 28 outside the stator vane 24 (turbine blade 40) via an outlet opening 64 formed at the radially inner end 54 (on the inner shroud 86 side) of the blade body 42 and an internal passage 87 formed inside the inner shroud 86, or is discharged into the combustion gas through cooling holes 70 in the trailing edge portion, which will be described later. By supplying the cooling fluid to the serpentine passage 61, the blade body 42 disposed in the combustion gas passage 28 of the turbine 6 and exposed to the hot combustion gas is cooled.

In some embodiments, as shown in FIGS. 2 and 3, the trailing edge portion (portion including the trailing edge 46) of the blade body 42 has a plurality of cooling holes 70 arranged along the blade height direction. The plurality of cooling holes 70 communicate with the cooling passage (most downstream passage 66 of the serpentine passage 61 in the illustrated example) formed inside the blade body 42 and open to the surface in the trailing edge portion 47 of the blade body 42.

The cooling fluid flowing through the cooling passage (most downstream passage 66 of the serpentine passage 61 in the illustrated example) partially passes through the cooling holes 70 and flows out to the combustion gas passage 28 outside the turbine blade 40 through the openings in the trailing edge portion of the blade body 42. Thus, as the cooling fluid passes through the cooling holes 70, the trailing edge portion 47 of the blade body 42 is convectively cooled.

On at least some inner wall surfaces 63 of the plurality of cooling passages 60, rib-shaped turbulators 34 are disposed. In the exemplary embodiment shown in FIGS. 2 and 3, a plurality of turbulators 34 are disposed on each of the inner wall surfaces 63 of the plurality of cooling passages 60.

Figure 10:
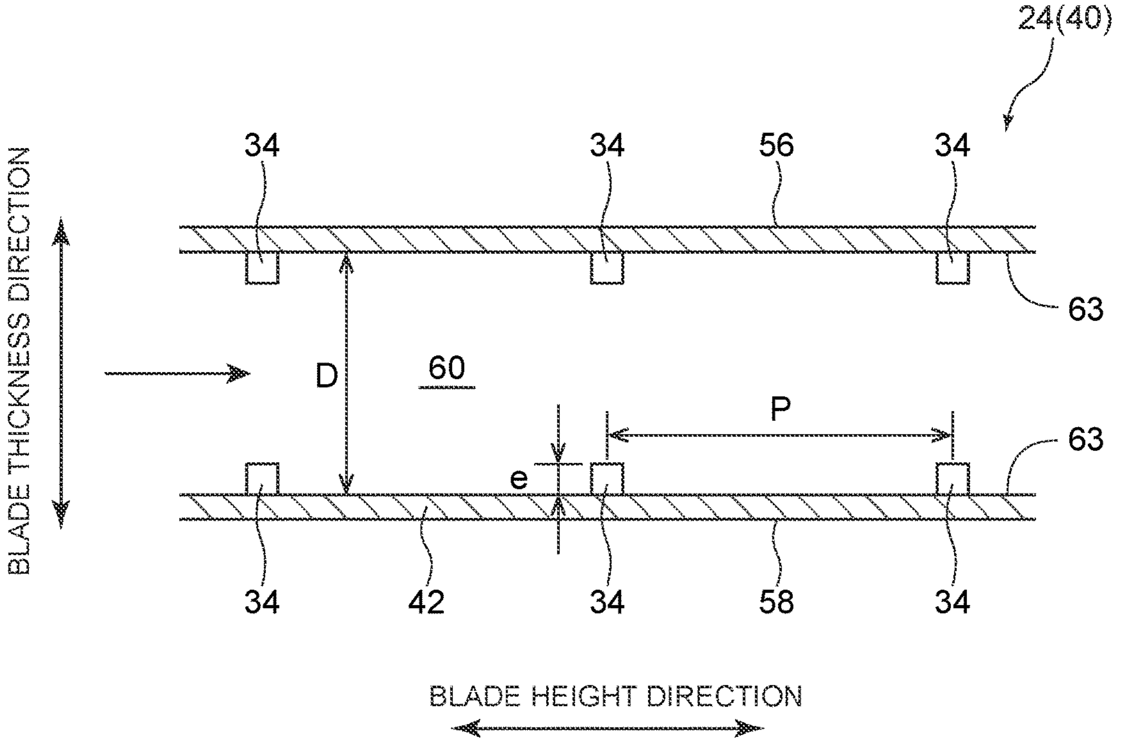
FIG. 10 is a schematic diagram for describing a configuration of turbulators according to an embodiment.
Figure 11:
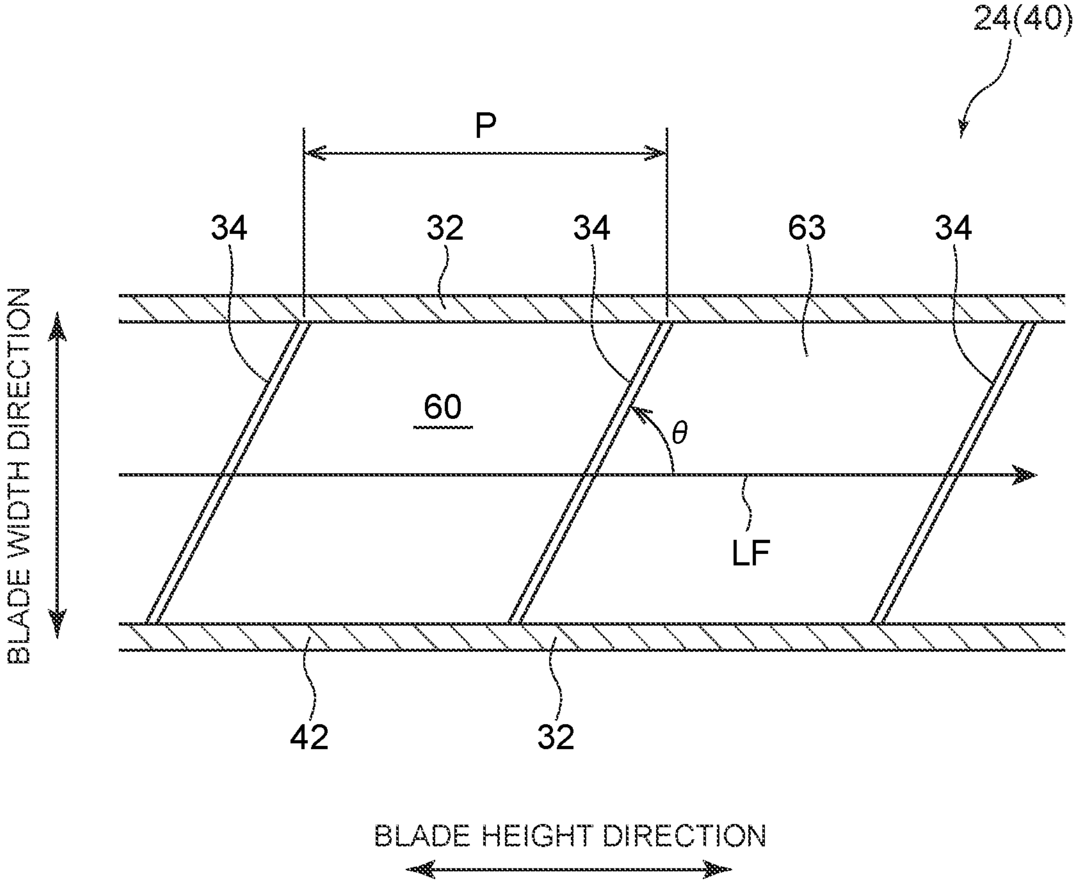
FIG. 11 is a schematic diagram for describing a configuration of turbulators according to an embodiment.

Here, FIGS. 10 and 11 are each a schematic diagram for describing a configuration of the turbulators 34 according to an embodiment. FIG. 10 is a schematic partial cross-sectional view along a plane including the blade height direction and the blade thickness direction (the circumferential direction of the rotor 8) of the turbine blade 40 shown in FIGS. 2 and 3. FIG. 11 is a schematic partial cross-sectional view along a plane including the blade height direction and the blade width direction (the axial direction of the rotor 8) of the turbine blade 40 shown in FIGS. 2 and 3.

As shown in FIG. 10, each turbulator 34 is disposed on the inner wall surface 63 of the cooling passage 60, and "e" indicates the height of the turbulator 34 from the inner wall surface 63. Further, as shown in FIGS. 10 and 11, in the cooling passage 60, the plurality of turbulators 34 are disposed at intervals of pitch P. Further, as shown in FIG. 11, θ indicates the acute angle (hereinafter, also referred to as "inclination angle") between the flow direction (arrow LIE in FIG. 11) of the cooling fluid in the cooling passage 60 and each turbulator 34. In other words, the acute angle formed between the extension direction of the cooling passage 60 (along the blade height direction) and the extension direction of each turbulator 34 on the inner wall surface 63 of the cooling passage 60 is the inclination angle θ of the turbulator 34.

The turbulator 34 in the cooling passage 60 promotes the turbulence of flow, such as swirl in the vicinity of the turbulator 34, when the cooling fluid flows through the cooling passage 60. More specifically, the cooling fluid having passed through the turbulator 34 forms swirl between the turbulator 34 and its downstream adjacent turbulator 34. As a result, in the vicinity of the middle position between the turbulators 34 adjacent in the flow direction of the cooling fluid the swirl of the cooling fluid adheres to the inner wall surface 63 of the cooling passage 60, increasing the heat transfer coefficient between the cooling fluid and the blade body 42. Accordingly, it is possible to effectively cool the turbine blade 40.

The occurrence state of swirl of the cooling fluid varies with the inclination angle θ of the turbulator 34, which affects the heat transfer coefficient between the cooling fluid and the inner wall surface 63 of the blade body 42. Further, when the height e of the turbulator 34 is too high relative to the pitch P of the turbulators 34, the swirl may not adhere to the inner wall surface 63. Therefore, there are appropriate relations between the heat transfer coefficient and the inclination angle θ of the turbulator 34, and between the heat transfer coefficient and the ratio of the pitch P to the height e.

Hereinafter, the turbine blade 40 according to some embodiments will be described in more detail. FIGS. 4 to 7 are each a schematic cross-sectional view of the stator vane 24 (turbine blade 40) according to an embodiment. FIG. 8 is a schematic cross-sectional view of the rotor blade 26 (turbine blade 40) according to an embodiment. The arrows in the figures indicate the flow direction of the cooling fluid.

Prior to describing the features of the turbulators 34 of the turbine blade 40 according to some embodiments, the configuration of the turbine blade 40 according to embodiments shown in FIGS. 4 to 8 will be described.

The stator vane 24 (turbine blade 40) shown in FIGS. 4 to 7 has the same configuration as the stator vane 24 shown in FIGS. 2 and 3 basically. However, in the exemplary embodiment shown in FIG. 6, the serpentine passage 61 formed in the turbine blade 40 is composed of three cooling passages **60*a*, 60*b*, and 60*e*. Among them, the cooling passage 60*a* closest to the leading edge 44 is the most upstream passage 65, the cooling passage 60*e* closest to the trailing edge 46 is the most downstream passage 66, and the cooling passage 60*h* between the most upstream passage 65 and the most downstream passage 66 is the intermediate passage 67**.

The rotor blade 26 (turbine blade 40) shown in FIG. 8 includes a blade body 42 and a platform 80. The blade body 42 is disposed so as to extend along the blade height direction (or the radial direction of the rotor 8), and has a base end (radially inner end) 50 fixed to the platform 80 and located on the radially inner side, and a tip end (radially outer end) 48 located on the opposite side from the base end 50 in the blade height direction and forming the top of the blade body 42.

The blade body 42 of the rotor blade 26 has the same configuration as the blade body 42 of the stator vane 24 described with reference to FIGS. 2 and 3 basically. Specifically, the blade body 42 of the rotor blade 26 has a leading edge 44 and a trailing edge 46 from the tip end 48 to the base end 50. The blade surface of the blade body 42 includes a positive-pressure surface (pressure surface) 56 and a negative-pressure surface (suction surface) 58 extending along the blade height direction between the tip end 48 and the base end 50. Inside the blade body 42 of the rotor blade 26, a serpentine passage 61 composed of a plurality of cooling passages 60 is formed. In the exemplary embodiment shown in FIG. 8, the serpentine passage 61 is composed of five cooling passages 60*a* to 60*e*.

In the rotor blade 26 (turbine blade 40) shown in FIG. 8, the cooling fluid is introduced into the serpentine passage 61 via an internal passage (not shown) formed inside the platform 80 and an inlet opening 62 formed at the base end 50 of the blade body 42, and the cooling fluid flows downward through the plurality of cooling passages 60 sequentially. Then, the cooling fluid flowing through the most downstream passage 66 most downstream in the flow direction of the cooling fluid among the plurality of cooling passages 60 flows out to the combustion gas passage 28 outside the rotor blade 26 (turbine blade 40) via an outlet opening 64 formed at the tip end 48 of the blade body 42, or is discharged into the combustion gas through cooling holes 70 in the trailing edge portion.

In the rotor blade 26, the above-described turbulators 34 are disposed on at least some inner wall surfaces of the plurality of cooling passages 60. In the exemplary embodiment shown in FIG. 8, the plurality of turbulators 34 are disposed on each of the inner wall surfaces of the plurality of cooling passages 60.

The features of the turbulators 34 of the turbine blade 40 according to some embodiments will now be described with reference to FIGS. 4 to 8.

In the turbine blade 40 shown in FIGS. 4 to 8, θa, θb, θc, θd, and θe are inclination angles of the turbulators 34 in the cooling passages 60*a* to 60*e*, respectively, Pa, Pb, Pc, Pd, and Pe are pitches of adjacent turbulators 34 in the respective passages, i.e., the cooling passages 60*a* to 60*e*, respectively, and ea, eb, cc, ed, and ee are heights (or average heights) of the adjacent turbulators 34 in the respective passages, respectively. In the exemplary embodiment shown in FIGS. 4 to 8, the inclination angles of the plurality of turbulators 34 on the inner wall surface 63 are the same in each cooling passage 60 (60*a* to 60*e*).

Figure 4:
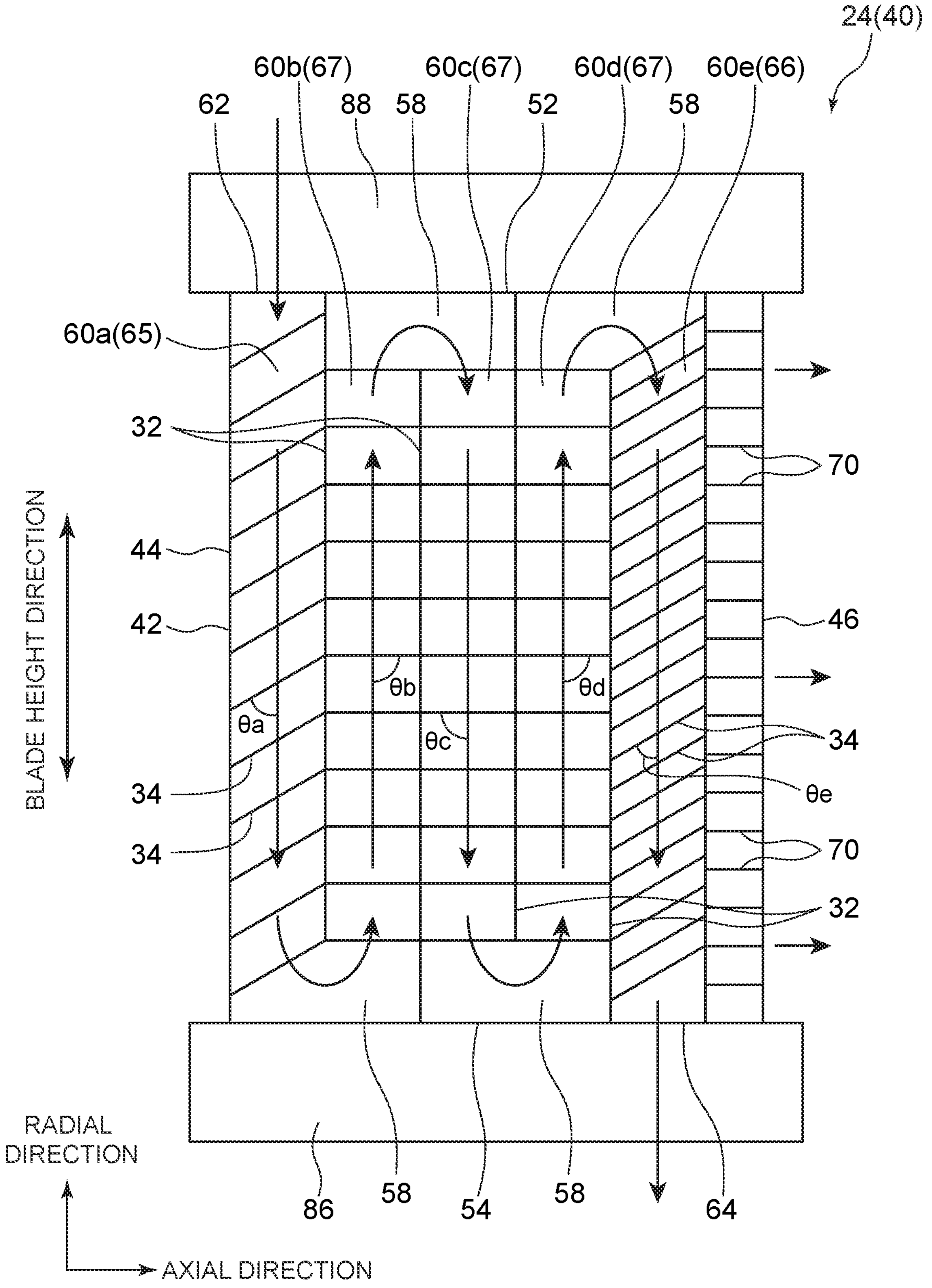
FIG. 4 is a schematic cross-sectional view of a stator vane (turbine blade) according to an embodiment.
Figure 5:
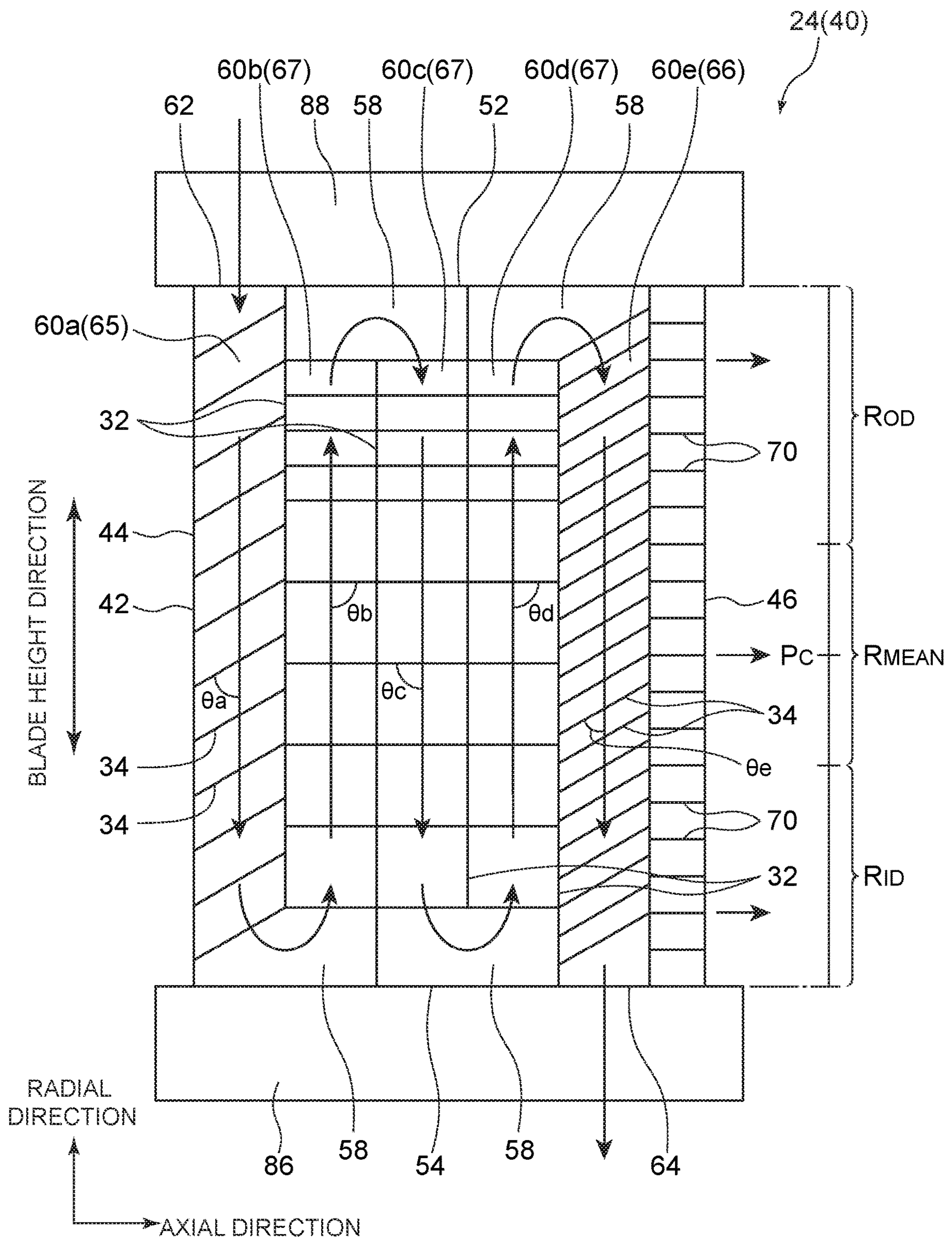
FIG. 5 is a schematic cross-sectional view of a stator vane (turbine blade) according to an embodiment.
Figure 7:
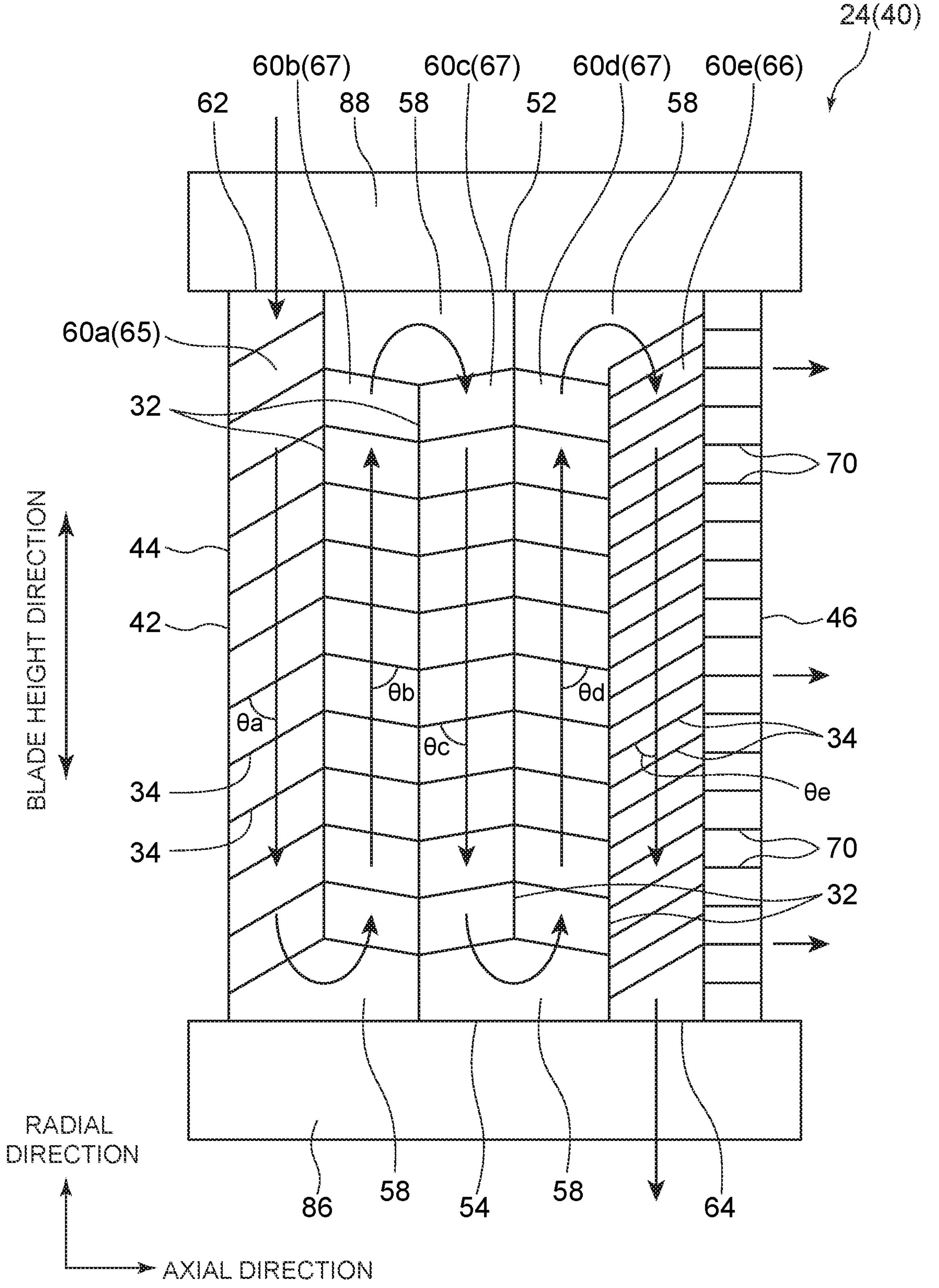
FIG. 7 is a schematic cross-sectional view of a stator vane (turbine blade) according to an embodiment.
Figure 8:
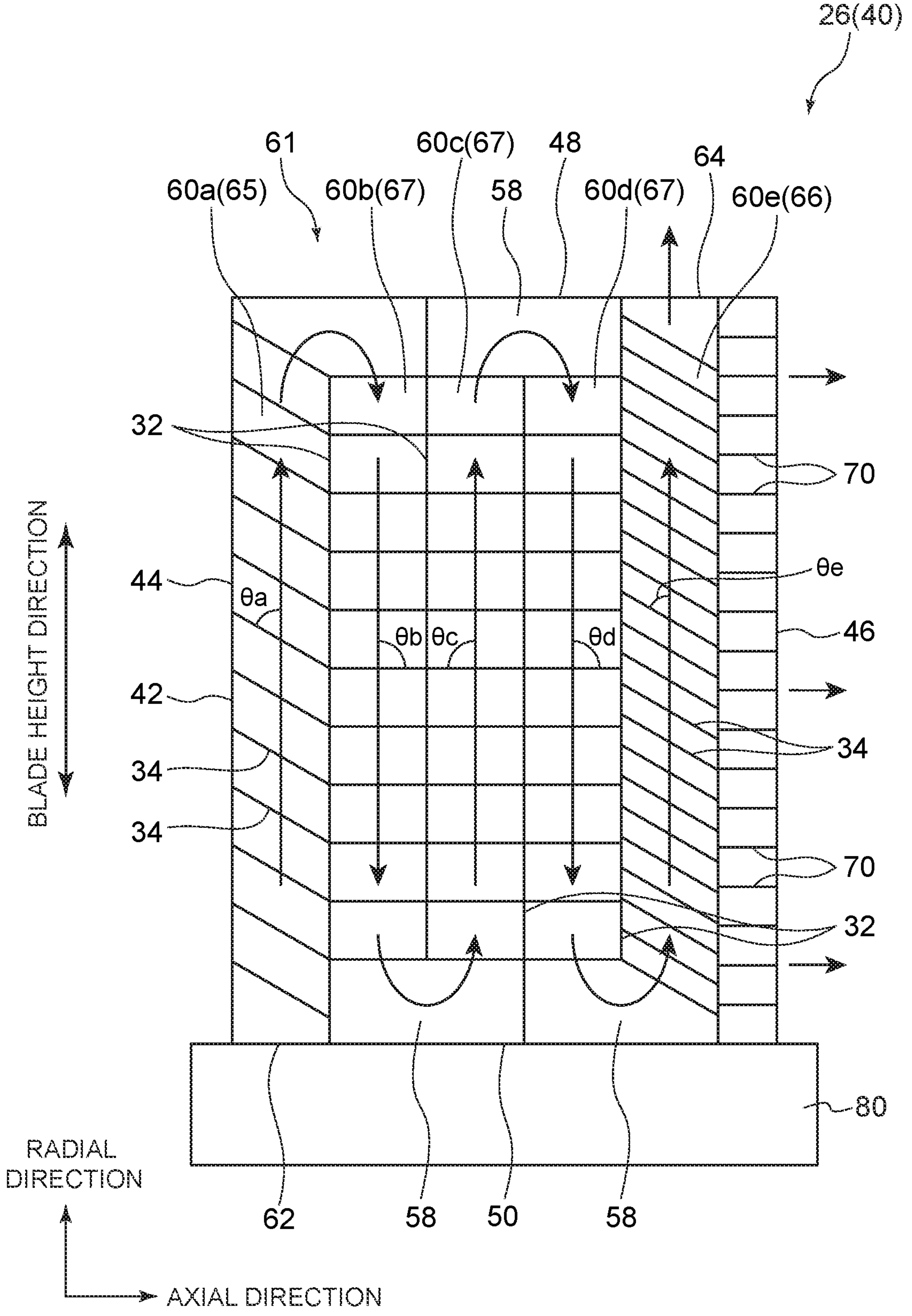
FIG. 8 is a schematic cross-sectional view of a rotor blade (turbine blade) according to an embodiment.

In the stator vane 24 shown in FIGS. 4, 5, and 7, the inclination angles of the turbulators 34 in the cooling passages 60*a* to 60*e* satisfy θa<θb=θc=θd and θe<θb=θc=θd. Moreover, θa=θe. In the stator vane 24 shown in FIGS. 4 and 5, θb=θc=θd=90 degrees, in the stator vane 24 shown in FIG. 7. θb=θc=θd<90 degrees.

Figure 6:
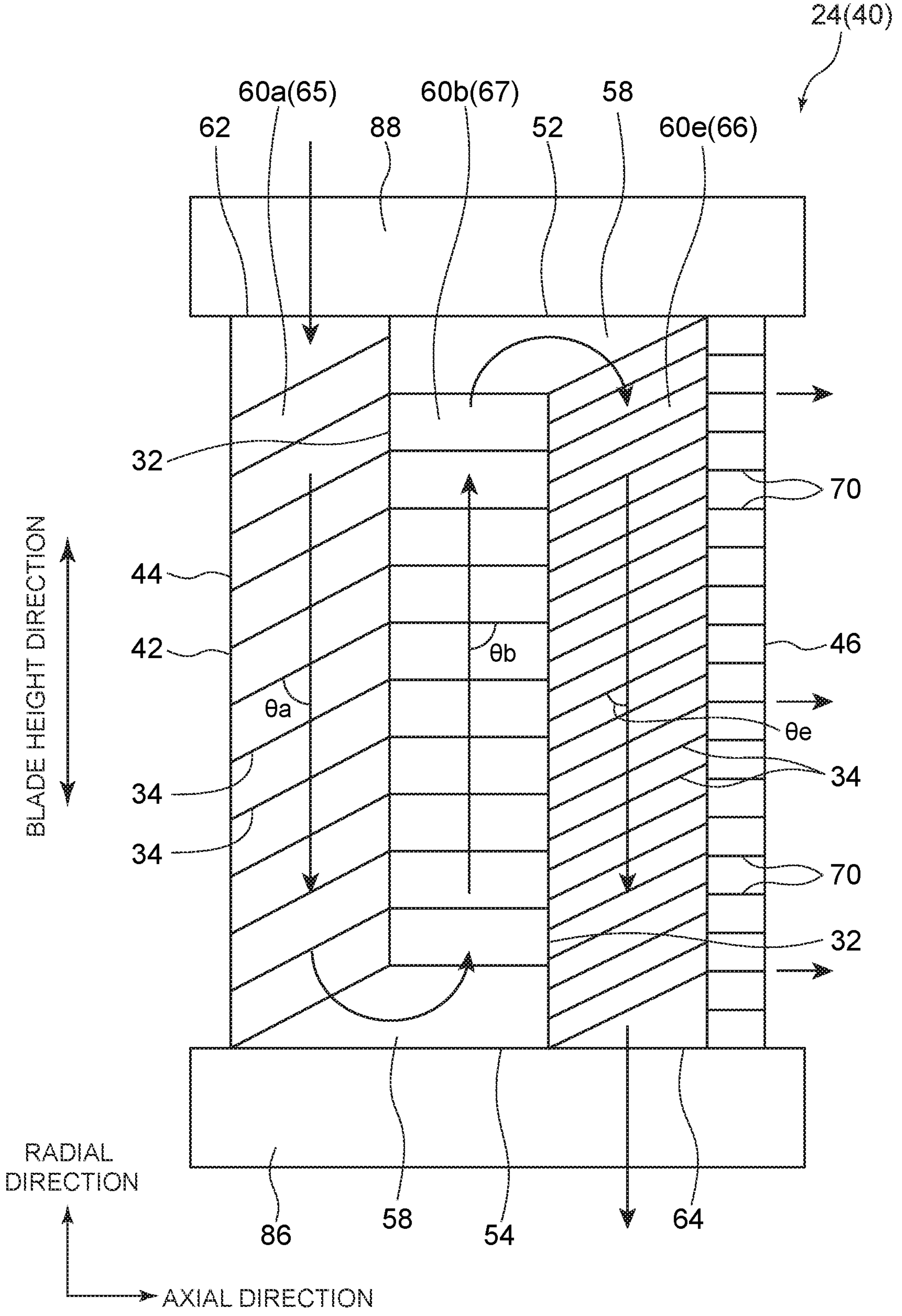
FIG. 6 is a schematic cross-sectional view of a stator vane (turbine blade according to an embodiment.

In the stator vane 24 shown in FIG. 6, the inclination angles of the turbulators 34 in the cooling passages 60*a*, 60*b*, and 60*c* satisfy θa<θb and θe<θb. In the stator vane 24 shown in FIG. 6, θb=90 degrees. Moreover, θa=θe.

In the rotor blade 26 shown in FIG. 8, the inclination angles of the turbulators 34 in the cooling passages 60*a* to 60*e* satisfy θa<θb=θc=θd and θe<θb=θc=θd. Moreover, θa=θe. In the rotor blade 26 shown in FIG. 8, θb=θc=θd=90 degrees.

In some embodiments, an average value of the inclination angles (first angles) of the plurality of turbulators 34 (first turbulators) disposed in the most upstream passage 65 is smaller than an average value of the inclination angles (second angles) of the plurality of turbulators 34 (second turbulators) disposed in the intermediate passage 67. For example, in the exemplary embodiments shown in FIGS. 4 to 8, an average value of the inclination angles θa ((first angles) of the plurality of turbulators 34 disposed in the cooling passage 60*a*, which is the most upstream passage 65, is smaller than an average value of the inclination angles θb, θc, or θd (second angles) of the plurality of turbulators 34 (second turbulators) disposed in the cooling passage 60*b*, 60*c*, or 60*d*, which are the intermediate passages 67. Herein, "average value" indicates arithmetic mean.

In some embodiments, each of the inclination angles (first angles) of the plurality of turbulators 34 (first turbulators) disposed in the most upstream passage 65 is smaller than each of the inclination angles (second angles) of the plurality of turbulators 34 (second turbulators) disposed in the intermediate passage 67. For example, in the exemplary embodiments shown in FIGS. 4 to 8, each of the inclination angles θa (first angles) of the plurality of turbulators 34 disposed in the cooling passage 60*a*, which is the most upstream passage 65, is smaller than each of the inclination angles θb, θc, or θd (second angles) of the plurality of turbulators 34 (second turbulators) disposed in the cooling passage 60*b*, 60*c*, or 60*d*, which are the intermediate passages 67.

According to the above-described embodiments, since the first angle (θa), which is the inclination angle of the first turbulators disposed in the most upstream passage 65 (cooling passage 60*a*), is relatively small, the heat transfer coefficient between the cooling fluid and the blade body 42 can be relatively increased in the most upstream passage 65, and the leading edge portion (where the most upstream passage 65 is disposed) of the blade body 42, which has a high cooling load, can be cooled effectively. Additionally, according to the above-described embodiments, since the second angle (θb, θc, or θd), which is the inclination angle of the second turbulators disposed in the intermediate passage 67 (cooling passage 60*b*, 60*c*, or 60*d*) forming the serpentine passage 61, is relatively large, the heat transfer coefficient between the cooling fluid and the blade body 42 can be relatively decreased in the intermediate passage 67, and excessive cooling of the turbine blade 40, which tends to occur in the intermediate portion (where the intermediate passage 67 is disposed) of the blade body 42 depending on the installation position of the turbine blade 40 (e.g., installation position in the axial direction), can be suppressed. Additionally, as described above, since the heat transfer coefficient in the intermediate passage 67 is relatively small, the temperature rise of the cooling fluid in the intermediate passage 67 can be suppressed. Thus, air whose temperature has not risen much can be supplied to the most downstream passage 66 (cooling passage 60*e*), and the blade body 42 can be cooled effectively. Therefore, according to the above-described embodiments, it is possible to effectively cool the turbine blade 40 while suppressing excessive cooling.

In some embodiments, an average value of the inclination angles (third angles) of the plurality of turbulators 34 (third turbulators) disposed in the most downstream passage 66 is smaller than an average value of the inclination angles (second angles) of the plurality of turbulators 34 (second turbulators) disposed in the intermediate passage 67. For example, in the exemplary embodiments shown in FIGS. 4 to 8, an average value of the inclination angles θe (third angles) of the plurality of turbulators 34 disposed in the cooling passage 60*e*, which is the most downstream passage 66, is smaller than an average value of the inclination angles θb, θc, or θd (second angles) of the plurality of turbulators 34 (second turbulators) disposed in the cooling passage 60*b*, 60*c*, or 60*d*, which are the intermediate passages 67.

In some embodiments, each of the inclination angles (third angles) of the plurality of turbulators 34 (third turbulators) disposed in the most downstream passage 66 is smaller than each of the inclination angles (second angles) of the plurality of turbulators 34 (second turbulators) disposed in the intermediate passage 67. For example, in the exemplary embodiments shown in FIGS. 4 to 8, each of the inclination angles 11*e* (third angles) of the plurality of turbulators 34 disposed in the cooling passage 60*e*, which is the most downstream passage 66, is smaller than each of the inclination angles θb, θc, or θd (second angles) of the plurality of turbulators 34 (second turbulators) disposed in the cooling passage 60*b*, 60*c*, or 60*d*, which are the intermediate passages 67.

According to the above-described embodiments, since the third angle (0*e*), winch is the inclination angle of the third turbulators disposed in the most downstream passage 66 forming the serpentine passage 61, is smaller than the second angle (θb, θc, or θd), the heat transfer coefficient between the cooling fluid and the blade body 42 can be relatively increased in the most downstream passage 66. Thus, cooling of the turbine blade 40 can be enhanced in the downstream region of the serpentine passage 61 where relatively hot cooling fluid having passed through the most upstream passage 65 and the intermediate passage 67 is supplied. Consequently, it is possible to cool the turbine blade 40 more effectively while suppressing excessive cooling more effectively.

In some embodiments, the average value of the second angles is not less than 85 degrees and not more than 90 degrees. In an embodiment, each of the second angles is not less than 85 degrees and not more than 90 degrees.

In the range where the inclination angle of the turbulators 34 is around 90 degrees, the heat transfer coefficient between the cooling fluid and the turbine blade tends to increase as the inclination angle decreases. In this regard, according to the above-described embodiments, since the second angle (θb, θc, or θd) of the second turbulators in the intermediate passage 67 is not less than 85 degrees and not more than 90 degrees, the heat transfer coefficient in the intermediate passage 67 can be suppressed effectively. Consequently, it is possible to suppress excessive cooling of the turbine blade 40 effectively.

In some embodiments, an absolute value of a difference between the average value of the first angles and the average value of the third angles is not less than 0 degrees and not more than 5 degrees. For example, in the exemplary embodiments shown in FIGS. 4 to 8, an absolute value (|θa−θb|, |θa−θc| or |θa−θd|) of the difference between the average value of the inclination angles θa (first angles) of the plurality of turbulators 34 disposed in the cooling passage 60*a*, which is the most upstream passage 65, and the average value of the inclination angles θb, θc, or θd (second angles) of the plurality of turbulators 34 (second turbulators) disposed in the cooling passage 60*b*, 60*c*, or 60*d*, which are the intermediate passages 67, may be not less than 0 degrees and not more than 5 degrees.

In some embodiments, each of the absolute values of the differences between the first angles of the plurality of first turbulators and the third angles of the plurality of third turbulators is not less than 0 degrees and not more than 5 degrees. For example, in the exemplary embodiments shown in FIGS. 4 to 8, an absolute value (e.g., |θa−θb|, |θa−θc|, or |θa−θd|) of the difference between a certain inclination angle θa (first angle) of the plurality of turbulators 34 disposed in the cooling passage 60*a*, which is the most upstream passage 65, and a certain inclination angle θb, θc, or θd (second angle) of the plurality of turbulators 34 (second turbulators) disposed in the cooling passage 60*b*, 60*c*, or 60*d*, which are the intermediate passages 67, may be not less than 0 degrees and not more than 5 degrees.

In some embodiments, an average value of the inclination angles (first angles) of the plurality of turbulators 34 disposed in the most upstream passage 65, and an average value of the inclination angles (third angles) of the plurality of turbulators 34 disposed in the most downstream passage 66 both may be not less than 50 degrees and not more than 70 degrees or not less than 55 degrees and not more than 65 degrees.

In some embodiments, each of the inclination angles (first angles) of the plurality of turbulators 34 disposed in the most upstream passage 65 and each of the inclination angles (third angles) of the plurality of turbulators 34 disposed in the most downstream passage 66 both may be not less than 50 degrees and not more than 70 degrees or not less than 55 degrees and not more than 65 degrees.

In some embodiments, a difference between the average value of the second angles and the average value of the first angles is not less than 15 degrees and not more than 45 degrees.

According to the above-described embodiments, since the difference between the average value of the second angles (θb, θc, or θd) and the average value of the first angles (θa) is not less than 15 degrees and not more than 45 degrees, the difference between the heat transfer coefficient in the most upstream passage 65, where the first turbulators are disposed, and the heat transfer coefficient in the intermediate passage 67, where the second turbulators are disposed, can be somewhat increased. As a result, the front edge portion (where the most upstream passage 65 is disposed) of the blade body 42, which has a high cooling load, can be effectively cooled, while excessive cooling in the intermediate portion (where the intermediate passage 67 is disposed) of the blade body 42 can be suppressed. In addition, the temperature rise of the cooling fluid supplied to the most downstream passage 66 can be suppressed. Therefore, according to the above-described embodiments, it is possible to effectively cool the turbine blade 40 while suppressing excessive cooling effectively.

In some embodiments, a difference between the average value of the second angles and the average value of the third angles is not less than 15 degrees and not more than 45 degrees.

According to the above-described embodiments, since the difference between the average value of the second angles (θb, θc, or θd) and the average value of the third angles (θe) is not less than 15 degrees and not more than 45 degrees, the difference between the heat transfer coefficient in the most downstream passage 66, where the third turbulators are disposed, and the heat transfer coefficient in the intermediate passage 67, where the second turbulators are disposed, can be somewhat increased. As a result, the temperature rise of the cooling fluid flowing through the intermediate passage 67 can be suppressed, while the heat transfer between the cooling fluid and the blade body 42 in the most downstream passage 66 can be facilitated. Consequently, it is possible to enhance cooling of the turbine blade 40 in the downstream region of the serpentine passage 61 while suppressing excessive cooling of the turbine blade 40 effectively.

In some embodiments, a ratio P2/e2 of a pitch P2 between a pair of adjacent turbulators 34 of the plurality of turbulators 34 (second turbulators) disposed in the intermediate passage 67 to a height e2 of the adjacent turbulators 34 satisfies a relationship of: $[P2/E2]_{OD}<[P2/e2]_{MEAN}$ and $[P2/e2]_{OD}<[P2/e2]_{ID}$, where $[P2/e2]_{OD}$ is the ratio in an outer-diameter-side region $R_{OD}$, $[P2/e2]_{ID}$ is the ratio in an inner-diameter-side region $R_{ID}$, and $[P2/e2]_{MEAN}$ is the ratio in a central region $R_{MEAN}$. Here, the central region $R_{MEAN}$ is a region including a middle position Pc of the blade body 42 in the blade height direction, the outer-diameter-side region $R_{OD}$ is a region between the central region $R_{MEAN}$ and the radially outer end 52 (or the tip end 48) in the blade height direction, and the inner-diameter-side region $R_{ID}$ is a region between the central region $R_{MEAN}$ and the radially inner end 54 (or the base end 50) in the blade height direction (see FIG. 5). The central region $R_{MEAN}$, the outer-diameter-side region $R_{OD}$, and the inner-diameter-side region $R_{ID}$ may each be one of three equal parts of the extension region of the blade body 42 in the blade height direction.

In some embodiments, for the plurality of turbulators 34 (second turbulators) disposed in the intermediate passage 67, an average value of the ratios $[P2/e2]_{OD}$ in the outer-diameter-side region $R_{OD}$ is smaller than an average value of the ratios $[P2/e2]_{MEAN}$ in the central region $R_{MEAN}$, and an average value of the ratios $[P2/e2]_{OD}$ in the outer-diameter-side region $R_{OD}$ is smaller than an average value of the ratios $[P2/e2]_{ID}$ in the inner-diameter-side region $R_{ID}$.

In some embodiments, for the plurality of turbulators 34 (second turbulators) disposed in the intermediate passage 67, each of the ratios $[P2/e2]_{OD}$ in the outer-diameter-side region $R_{OD}$ is smaller than each of the ratios $[P2/e2]_{MEAN}$ in the central region $R_{MEAN}$, and each of the ratios $[P2/e2]_{OD}$ in the outer-diameter-side region $R_{OD}$ is smaller than each of the ratios $[P2/e2]_{ID}$ in the inner-diameter-side region $R_{ID}$.

In some embodiments, for example, as shown in FIG. 5, tier the plurality of turbulators 34 (second turbulators) disposed in the intermediate passage 67, the pitch P2 in the outer-diameter-side region $R_{OD}$ is smaller than the pitch P2 in the central region $R_{MEAN}$, and the pitch P2 in the outer-diameter-side region $R_{OD}$ is smaller than the pitch P2 in the inner-diameter-side region $R_{ID}$.

In a certain range of pitch P and height e of the turbulators 34, the heat transfer coefficient between the cooling fluid and the blade body 42 tends to increase as the ratio P/e of pitch P to height e decreases. Further, the temperature distribution of combustion gas in the combustion gas passage 28 where the turbine blade 40 is disposed may be higher in the radially outer region, depending on the installation position of the turbine blade 40 (e.g., installation position in the axial direction). In this regard, according to the above-described embodiments, since the ratio P2/e2 of pitch P2 to height e2 of the second turbulators in the intermediate passage 67 is smaller in the outer-diameter-side region $R_{OD}$ than in the central region $R_{MEAN}$ and the inner-diameter-side region $R_{ID}$ in the blade height direction, the cooling effect of the turbine blade 40 can be enhanced in the outer-diameter-side region $R_{OD}$. Consequently, it is possible to cool the turbine blade 40 effectively so that the temperature of the turbine blade 40 does not become excessively high in the outer-diameter-side region $R_{OD}$ where the combustion gas temperature is relatively high as described above.

In some embodiments, a ratio $[P1/e1]_{MEAN}$ of a pitch P1 between a pair of adjacent turbulators 34 (first turbulators) of the plurality of turbulators 34 (first turbulators) disposed in the most upstream passage 65 to a height e1 of the pair of turbulators 34 (first turbulators) with respect to the inner wall surface 63 of the most upstream passage 65 in the central region $R_{MEAN}$ and a ratio $[P2/e2]_{MEAN}$ of a pitch P2 between a pair of adjacent turbulators 34 (second turbulators) of the plurality of turbulators 34 (second turbulators) disposed in the intermediate passage 67 to a height e2 of the pair of turbulators 34 (second turbulators) with respect to the inner wall surface 63 of the intermediate passage 67 in the central region $R_{MEAN}$ satisfy a relationship of: $[P1/e1]_{MEAN} < [P2/e2]_{MEAN}$.

In some embodiments, an average value of the ratios $[P1/e1]_{MEAN}$ in the central region $R_{MEAN}$ for the plurality of turbulators 34 (first turbulators) disposed in the most upstream passage 65 is smaller than an average value of the ratios $[P2/e2]_{MEAN}$ in the central region $R_{MEAN}$ for the plurality of turbulators 34 (second turbulators) disposed in the intermediate passage 67.

In some embodiments, each of the ratios $[P1/e1]_{MEAN}$ in the central region $R_{MEAN}$ for the plurality of turbulators 34 (first turbulators) disposed in the most upstream passage 65 is smaller than each of the ratios $[P2/e2]_{MEAN}$ in the central region $R_{MEAN}$ for the plurality of turbulators 34 (second turbulators) disposed in the intermediate passage 67.

According to the above-described embodiments, in the central region $R_{MEAN}$ in the blade height direction, the ratio $[P1/e1]_{MEAN}$ of pitch P1 to height e1 of the first turbulators in the most upstream passage 65 is smaller than the ratio $[P2/e2]_{MEAN}$ of pitch P2 to height e2 of the second turbulators in the intermediate passage 67. As a result, in the central region $R_{MEAN}$, the front edge portion (where the most upstream passage 65 is disposed) of the blade body 42, which has a high cooling load, can be effectively cooled, while excessive cooling in the intermediate portion (where the intermediate passage 67 is disposed) of the blade body 42 can be suppressed. In addition, the temperature rise of the cooling fluid supplied to the most downstream passage 66 can be suppressed. Consequently, it is possible to cool the turbine blade 40 effectively while suppressing excessive cooling effectively.

In some embodiments, a ratio $[P3/e3]_{MEAN}$ of a pitch P3 between a pair of adjacent turbulators 34 (third turbulators) of the plurality of turbulators 34 (third turbulators) disposed in the most downstream passage 66 to a height e3 of the pair of turbulators 34 (third turbulators) with respect to the inner wall surface 63 of the most downstream passage 66 in the central region $R_{MEAN}$ and a ratio $[P2/e2]_{MEAN}$ of a pitch P2 between a pair of adjacent turbulators 34 (second turbulators) of the plurality of turbulators 34 (second turbulators) disposed in the intermediate passage 67 to a height e2 of the pair of turbulators 34 (second turbulators) with respect to the inner wall surface 63 of the intermediate passage 67 in the central region $R_{MEAN}$ satisfy a relationship of: $[P3/e3]_{MEAN} < [P2/e2]_{MEAN}$.

In some embodiments, an average value of the ratios $[P3/e3]_{MEAN}$ in the central region $R_{MEAN}$ for the plurality of turbulators 34 (third turbulators) disposed in the most downstream passage 66 is smaller than an average value of the ratios $[P2/e2]_{MEAN}$ in the central region $R_{MEAN}$ for the plurality of turbulators 34 (second turbulators) disposed in the intermediate passage 67.

In some embodiments, each of the ratios $[P3/e3]_{MEAN}$ in the central region $R_{MEAN}$ for the plurality of turbulators 34 (third turbulators) disposed in the most downstream passage 66 is smaller than each of the ratios $[P2/e2]_{MEAN}$ in the central region $R_{MEAN}$ for the plurality of turbulators 34 (second turbulators) disposed in the intermediate passage 67.

According to the above-described embodiments, in the central region $R_{MEAN}$ in the blade height direction, the ratio $[P3/e3]_{MEAN}$ of pitch P3 to height e3 of the third turbulators in the most downstream passage 66 is smaller than the ratio $[P2/e2]_{MEAN}$ of pitch P2 to height e2 of the second turbulators in the intermediate passage 67. As a result, in the central region $R_{MEAN}$, the heat transfer coefficient between the cooling fluid and the blade body 42 in the most downstream passage 66 can be relatively increased. Thus, cooling of the turbine blade 40 can be enhanced in the downstream region of the serpentine passage 61 where relatively hot cooling fluid having passed through the most upstream passage 65 and the intermediate passage 67 is supplied.

Figure 9:
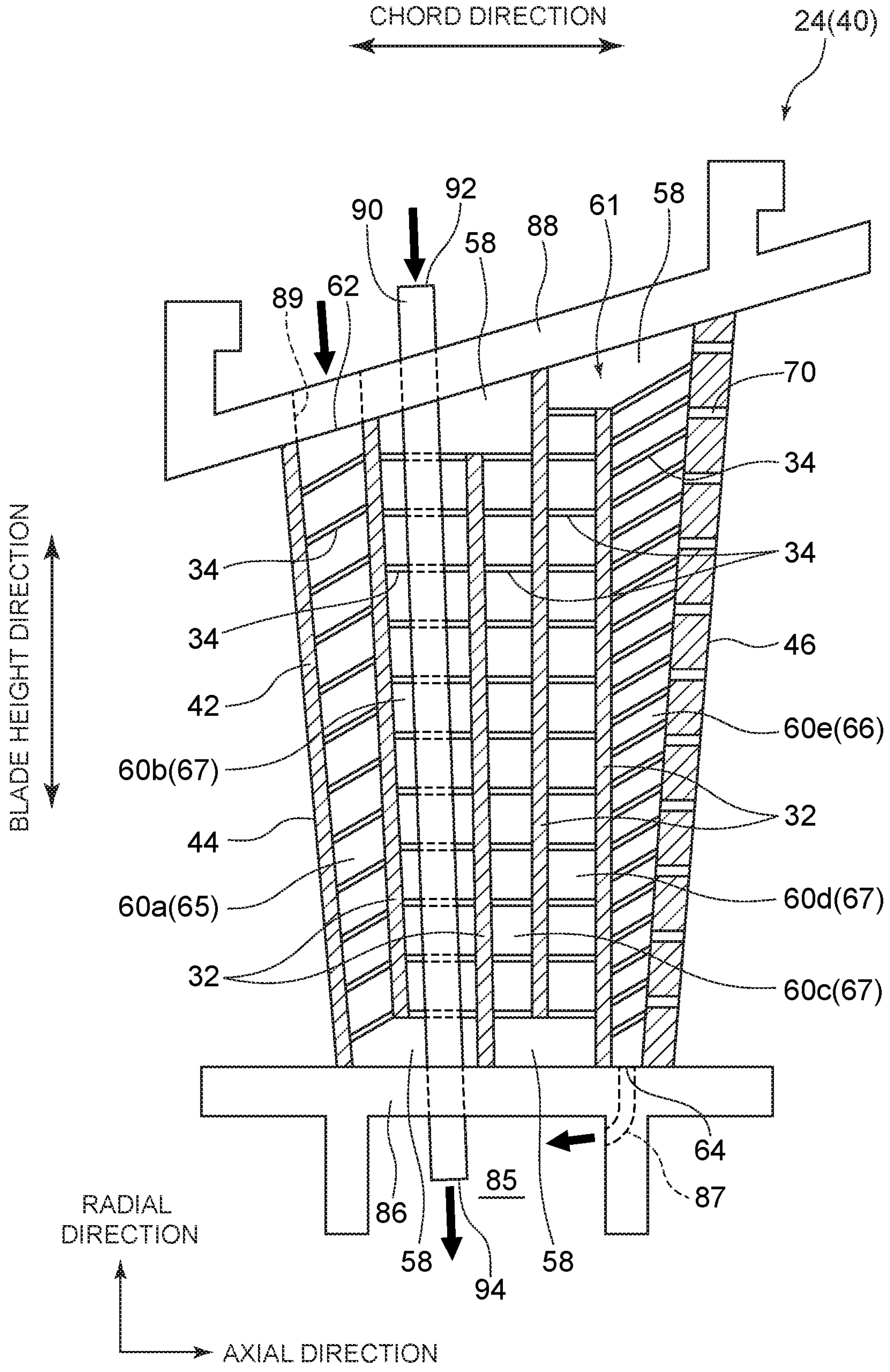
FIG. 9 is a schematic partial cross-sectional view of a stator vane (turbine blade) according to an embodiment taken along the blade height direction.

FIG. 9 is a schematic partial cross-sectional view of the stator vane 24 (turbine blade 40) according to an embodiment taken along the blade height direction. The stator vane 24 shown in FIG. 9 has the same configuration as the stator vane 24 shown in FIG. 2 basically.

In some embodiments, the stator vane 24 (turbine blade 40) includes, for example as shown in FIG. 9, a seal tube 90 penetrating the blade body 42 so as to extend along the blade height direction and disposed so as to pass through any of the at least one intermediate passage 67. In the exemplary embodiment shown in FIG. 9, the seal tube 90 is disposed to penetrate the outer shroud 88 and the inner shroud 86 of the stator vane 24 and pass through the cooling passage 60*b* (intermediate passage 67).

The seal tube 90 has an inlet opening 92 at one end and an outlet opening 94 at the other end. Seal fluid is supplied to the seal tube 90 through the inlet opening 92, and the seal fluid having passed through the path formed in the seal tube 90 is released through the outlet opening 94 into a cavity 85 formed radially inward of the inner shroud 86. Thus, it is possible to suppress the combustion gas from being drawn into the cavity 85 from the combustion gas passage 28. The seal tube 90 may be supplied with fluid (e.g., air) from the same supply source as the cooling fluid as the seal fluid.

The thickness (size in the direction perpendicular to the chord direction) of the blade body 42 with the airfoil shape is relatively small in the leading and trailing edge portions and relatively large in the intermediate portion between the leading and trailing edge portions in the chord direction. In this regard, according to the above-described embodiment, the intermediate passage 67 (cooling passage 60 in the intermediate portion), where the flow path area can be easily secured, is used to provide the seal tube 90 passing through the cooling passage 60 (intermediate passage 67) with the turbulators 34. Through the seal tube 90, seal fluid can be supplied to the turbine blade 40.

The contents described in the above embodiments would be understood as follows, for instance.

(1) A turbine blade (40) according to at least one embodiment of the present invention is provided with: a blade body (42); and a plurality of cooling passages (60) each of which extends inside the blade body along the blade height direction and which are connected to each other via return portions (58) disposed at an end portion in the blade height direction to form a serpentine passage (61). The plurality of cooling passages includes: a most upstream passage (65) disposed on the most upstream side in a flow of a cooling fluid among the plurality of cooling passages; a most downstream passage (66) disposed on the most downstream side in the flow of the cooling fluid among the plurality of cooling passages; and at least one intermediate passage (67) disposed between the most upstream passage and the most downstream passage among the plurality of cooling passages. The most upstream passage is disposed at a position closest to a leading edge (44) in the chord direction of the blade body among the plurality of cooling passages formed inside the blade body and extending along the height direction. The turbine blade is provided with: a plurality of first turbulators (34) disposed on are inner surface (63) of the most upstream passage and arranged along the blade height direction; a plurality of second turbulators (34) disposed on an inner wall surface of the at least one intermediate passage and arranged along the blade height direction; and a plurality of third turbulators (34) disposed on an inner wall surface of the most downstream passage and arranged along the blade height direction. An average value of first angles (θa) of the plurality of first turbulators with respect to a flow direction of the cooling fluid in the most upstream passage is smaller than an average value of second angles (θb, θc, or θd) of the plurality of second turbulators with respect to a flow direction of the cooling fluid in the at least one intermediate passage.

Hereinafter, the angle (θ) formed by the flow direction of the cooling fluid in the cooling passage and each turbulator on the inner wall surface of the cooling passage is also referred to as the inclination angle of the turbulator.

With the above configuration (1), since the first angle, which is the inclination angle of the first turbulators disposed in the most upstream passage, is relatively small, the heat transfer coefficient between the cooling fluid and the blade body can be relatively increased in the most upstream passage, and the leading edge portion (where the most upstream passage is disposed) of the blade body, which has a high cooling load, can be cooled effectively. Additionally, with the above configuration (1), since the second angle, which is the inclination angle of the second turbulators disposed in the intermediate passage forming the serpentine passage, is relatively large, the heat transfer coefficient between the cooling fluid and the blade body can be relatively decreased in the intermediate passage, and excessive cooling of the turbine blade, which tends to occur in the intermediate portion (where the intermediate passage is disposed) of the blade body depending on the installation position of the turbine blade or the like, can be suppressed. Additionally, as described above, since the heat transfer coefficient in the intermediate passage is relatively small, the temperature rise of the cooling fluid in the intermediate passage can be suppressed. Thus, air whose temperature has not risen much can be supplied to the most downstream passage, and the blade body can be cooled effectively. Therefore, with the above configuration (1), it is possible to effectively cool the turbine blade while suppressing excessive cooling.

(2) In some embodiments, in the above configuration (1), an average value of third angles (θe) of the plurality of third turbulators with respect to a flow direction of the cooling fluid in the most downstream passage is smaller than the average value of the second angles.

With the above configuration (2), since the third angle, which is the inclination angle of the third turbulators disposed in the most downstream passage forming the serpentine passage, is smaller than the second angle, the heat transfer coefficient between the cooling fluid and the blade body can be relatively increased in the most downstream passage. Thus, cooling of the turbine blade can be enhanced in the downstream region of the serpentine passage where relatively hot cooling fluid having passed through the most upstream passage and the intermediate passage is supplied. Consequently, it is possible to cool the turbine blade more effectively while suppressing excessive cooling more effectively.

(3) In some embodiments, in the above configuration (2), an absolute value of a difference between the average value of the first angles and the average value of the third angles is not less than 0 degrees and not more than 5 degrees.

With the above configuration (3), since the first angle of the plurality of first turbulators in the most upstream passage is nearly equal to the third angle of the third turbulators in the most downstream passage, the turbine blade is relatively easy to manufacture.

(4) In some embodiments, in any one of the above configurations (1) to (3), each of the second angles is not less than 85 degrees and not more than 90 degrees.

In the range where the inclination angle of the turbulators is around 90 degrees, the heat transfer coefficient between the cooling fluid and the turbine blade tends to increase as the inclination angle decreases. In this regard, with the above configuration (4), since the second angle of the second turbulators in the intermediate passage is not less than 85 degrees and not more than 90 degrees, the heat transfer coefficient in the intermediate passage can be suppressed effectively. Consequently, it is possible to suppress excessive cooling of the turbine blade effectively.

(5) In some embodiments, in any one of the above configurations (1) to (4), a difference between the average value of the second angles and the average value of the first angles is not less than 15 degrees and not more than 45 degrees.

With the above configuration (5), since the difference between the average value of the second angles and the average value of the first angles is not less than 15 degrees and not more than 45 degrees, the difference between the heat transfer coefficient in the most upstream passage, where the first turbulators are disposed, and the heat transfer coefficient in the intermediate passage, where the second turbulators are disposed, can be somewhat increased. As a result, the front edge portion (where the most upstream passage is disposed) of the blade body, which has a high cooling load, can be effectively cooled, while excessive cooling in the intermediate portion (where the intermediate passage is disposed) of the blade body can be suppressed. In addition, the temperature rise of the cooling fluid supplied to the most downstream passage can be suppressed. Therefore, with the above configuration (5), it is possible to effectively cool the turbine blade while suppressing excessive cooling effectively.

(6) In some embodiments, in any one of the above configurations (1) to (5), the turbine blade includes a seal tube (90) penetrating the blade body so as to extend along the blade height direction and disposed so as to pass through any of the at least one intermediate passage.

The thickness of the blade body with the airfoil shape is relatively small in the leading and trailing edge portions and relatively large in the intermediate portion between the leading and trailing edge portions. In this regard, with the above configuration (6), the intermediate passage (cooling passage in the intermediate portion), where the flow path area can be easily secured, is used to provide the seal tube passing through the cooling passage (intermediate passage) with the turbulators. Through the seal tube, seal fluid can be supplied to the turbine blade.

(7) In some embodiments, in any one of the above configurations (1) to (6), the blade body has a radially outer end (52) and a radially inner end (54) in the blade height direction, and extends along the blade height direction within a range that includes a central region ($R_{MEAN}$) including a middle position (Pc) of the blade body in the blade height direction, an outer-diameter-side region ($R_{OD}$) between the central region and the radially outer end in the blade height direction, and an inner-diameter-side region ($R_{ID}$) between the central region and the radially inner end in the blade height direction. A ratio P2/e2 of a pitch P2 between a pair of adjacent second turbulators of the plurality of second turbulators to a height e2 of the pair of second turbulators with respect to the inner wall surface of the at least one intermediate passage satisfies a relationship of: $[P2/e2]_{OD}<[P2/e2]_{MEAN}$ and $[P2/e2]_{OD}<[P2/e2]_{ID}$, where $[P2/e2]_{OD}$ is the ratio in the outer-diameter-side region, $[P2/e2]_{ID}$ is the ratio in the inner-diameter-side region, and $[P2/e2]_{MEAN}$ is the ratio in the central region.

In a certain range of pitch P and height e of the turbulators, the heat transfer coefficient between the cooling fluid and the blade body tends to increase as the ratio We of pitch P to height e decreases. Further, the temperature distribution of combustion gas in the combustion gas passage where the turbine blade is disposed may be higher in the radially outer region, depending on the installation position of the turbine blade. In this regard, with the above configuration (7), since the ratio P2/e2 of pitch P2 to height e2 of the second turbulators in the intermediate passage is smaller in the outer-diameter-side region than in the central region and the inner-diameter-side region in the blade height direction, the cooling effect of the turbine blade can be enhanced in the outer-diameter-side region. Consequently, it is possible to cool the turbine blade effectively so that the temperature of the turbine blade does not become excessively high in the outer-diameter-side region where the combustion gas temperature is relatively high as described above.

(8) In some embodiments, in any one of the above configurations (1) to (7), the blade body has a radially outer end and a radially inner end in the blade height direction, and extends along the blade height direction within a range that includes a central region including a middle position of the blade body in the blade height direction, an outer-diameter-side region between the central region and the radially outer end in the blade height direction, and an inner-diameter-side region between the central region and the radially inner end in the blade height direction. A ratio $[P1/e1]_{MEAN}$ of a pitch P1 between a pair of adjacent first turbulators of the plurality of first turbulators to a height e1 of the pair of first turbulators with respect to the inner wall surface of the most upstream passage in the central region, and a ratio $[P2/e2]_{MEAN}$ of a pitch P2 between a pair of adjacent second turbulators of the plurality of second turbulators to a height e2 of the pair of second turbulators with respect to the inner wall surface of the at least one intermediate passage in the central region satisfy a relationship of: $[P1/e1]_{MEAN}$ $[P2/e2]_{MEAN}$.

With the above configuration (8), in the central region in the blade height direction, the ratio $[P1/e1]_{MEAN}$ of pitch P1 to height e1 of the first turbulators in the most upstream passage is smaller than the ratio $[P2/e2]_{MEAN}$ of pitch P2 to height e2 of the second turbulators in the intermediate passage. As a result, in the central region, the front edge portion (where the most upstream passage is disposed) of the blade body, which has a high cooling load, can be effectively cooled, while excessive cooling in the intermediate portion (where the intermediate passage is disposed) of the blade body can be suppressed. In addition, the temperature rise of the cooling fluid supplied to the most downstream passage can be suppressed. Therefore, with the above configuration (8), it is possible to effectively cool the turbine blade while suppressing excessive cooling effectively.

(9) In some embodiments, in the above configuration (8), the ratio $[P2/e2]_{MEAN}$ and a ratio $[P3/e3]_{MEAN}$ of a pitch P3 between a pair of adjacent third turbulators of the plurality of third turbulators to a height e3 of the pair of third turbulators with respect to the inner wall surface of the most downstream passage in the central region satisfy a relationship of: $[P3/e3]_{MEAN}<[P2/e2]_{MEAN}$.

With the above configuration (9), in the central region in the blade height direction, the ratio $[P3/e3]_{MEAN}$ of pitch P3 to height e3 of the third turbulators in the most downstream passage is smaller than the ratio $[P2/e2]_{MEAN}$ of pitch P2 to height e2 of the second turbulators in the intermediate passage. As a result, in the central region, the heat transfer coefficient between the cooling fluid and the blade body in the most downstream passage can be relatively increased. Thus, cooling of the turbine blade can be enhanced in the downstream region of the serpentine passage where relatively hot cooling fluid having passed through the most upstream passage and the intermediate passage is supplied.

(10) A gas turbine (1) according to at least one embodiment of the present invention is provided with: a turbine (6) including the turbine blade (40) described in any one of the above (1) to (9); and a combustor (4) for producing a combustion gas flowing through a combustion gas passage (48) in which the turbine blade is disposed.

With the above configuration (10), since the first angle, which is the inclination angle of the first turbulators disposed in the most upstream passage, is relatively small, the heat transfer coefficient between the cooling fluid and the blade body can be relatively increased in the most upstream passage, and the leading edge portion (where the most upstream passage is disposed) of the blade body, which has a high cooling load, can be cooled effectively.

Additionally, with the above configuration (10), since the second angle, which is the inclination angle of the second turbulators disposed in the intermediate passage forming the serpentine passage, is relatively large, the heat transfer coefficient between the cooling fluid and the blade body can be relatively decreased in the intermediate passage, and excessive cooling of the turbine blade, which tends to occur in the intermediate portion (where the intermediate passage is disposed) of the blade body depending on the installation position of the turbine blade or the like, can be suppressed. Additionally, as described above, since the heat transfer coefficient in the intermediate passage is relatively small, the temperature rise of the cooling fluid in the intermediate passage can be suppressed. Thus, air whose temperature has not risen much can be supplied to the most downstream passage, and the blade body can be cooled effectively. Therefore, with the above configuration (10), it is possible to effectively cool the turbine blade while suppressing excessive cooling.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

The invention claimed is:

1. A turbine blade, comprising:

a blade body; and a plurality of cooling passages each of which extends inside the blade body along a blade height direction and which are connected to each other via return portions, each return portion being disposed at alternating ones of two opposite end portions in the blade height direction to form a serpentine passage, wherein the plurality of cooling passages includes:

a most upstream passage disposed on a most upstream side in a flow of a cooling fluid among the plurality of cooling passages;

a most downstream passage disposed on a most downstream side in the flow of the cooling fluid among the plurality of cooling passages; and at least one intermediate passage disposed between the most upstream passage and the most downstream passage among the plurality of cooling passages, wherein the most upstream passage is disposed at a position closest to a leading edge in a chord direction of the blade body among the plurality of cooling passages formed inside the blade body and extending along the blade height direction, wherein the turbine blade comprises:

a plurality of first turbulators disposed on an inner wall surface of the most upstream passage and arranged along the blade height direction;

a plurality of second turbulators disposed on an inner wall surface of the at least one intermediate passage and arranged along the blade height direction; and a plurality of third turbulators disposed on an inner wall surface of the most downstream passage and arranged along the blade height direction, wherein an average value of first angles of the plurality of first turbulators with respect to a flow direction of the cooling fluid in the most upstream passage is smaller than an average value of second angles of the plurality of second turbulators with respect to a flow direction of the cooling fluid in the at least one intermediate passage, wherein the blade body has a radially outer end and a radially inner end in the blade height direction, and extends along the blade height direction within a range that includes a central region including a middle position of the blade body in the blade height direction, an outer-diameter-side region between the central region and the radially outer end in the blade height direction, and an inner-diameter-side region between the central region and the radially inner end in the blade height direction, wherein $[P2/e2]_{OD}$ is a first ratio of a pitch P2 between a first pair of adjacent second turbulators of the plurality of second turbulators to a height e2 of the first pair of second turbulators with respect to the inner wall surface of the at least one intermediate passage, the first pair of adjacent second turbulators being in the outer-diameter-side region, wherein $[P2/e2]_{ID}$ is a second ratio of the pitch P2 between a second pair of adjacent second turbulators of the plurality of second turbulators to the height e2 of the second pair of second turbulators with respect to the inner wall surface of the at least one intermediate passage, the second pair of adjacent second turbulators being in the inner-diameter-side region, wherein $[P2/e2]_{MEAN}$ is a third ratio of the pitch P2 between a third pair of adjacent second turbulators of the plurality of second turbulators to the height e2 of the third pair of second turbulators with respect to the inner wall surface of the at least one intermediate passage, the third pair of adjacent second turbulators being in the central region, and wherein the first, second and third ratios satisfy a relationship of:

$$[P2/e2]_{OD}<[P2/e2]_{MEAN} \text{ and } [P2/e2]_{OD}<[P2/e2]_{ID}.$$

2. The turbine blade according to claim 1, wherein an average value of third angles of the plurality of third turbulators with respect to a flow direction of the cooling fluid in the most downstream passage is smaller than the average value of the second angles.

3. The turbine blade according to claim 2, wherein an absolute value of a difference between the average value of the first angles and the average value of the third angles is not less than 0 degrees and not more than 5 degrees.

4. The turbine blade according to claim 1, wherein each of the second angles is not less than 85 degrees and not more than 90 degrees.

5. The turbine blade according to claim 1, wherein a difference between the average value of the second angles and the average value of the first angles is not less than 15 degrees and not more than 45 degrees.

6. The turbine blade according to claim 1, further comprising a seal tube penetrating the blade body so as to extend along the blade height direction and disposed so as to pass through any of the at least one intermediate passage.

7. The turbine blade according to claim 1, wherein $[P1/e1]_{MEAN}$ is a fourth ratio of a pitch P1 between a pair of adjacent first turbulators of the plurality of first turbulators to a height e1 of the pair of first turbulators with respect to the inner wall surface of the most upstream passage in the central region, and the third and fourth ratios satisfy a relationship of:

$$[P1/e1]_{MEAN}<[P2/e2]_{MEAN}$$

8. The turbine blade according to claim 7, wherein $[P3/e3]_{MEAN}$ is a fifth ratio of a pitch P3 between a pair of adjacent third turbulators of the plurality of third turbulators to a height e3 of the pair of third turbulators with respect to the inner wall surface of the most downstream passage in the central region, and the third and fifth ratios satisfy a relationship of:

$$[P3/e3]_{MEAN}<[P2/e2]_{MEAN}.$$

9. A gas turbine, comprising:

a turbine including the turbine blade according to claim 1; and a combustor for producing a combustion gas flowing through a combustion gas passage in which the turbine blade is disposed.

* * * * *